No. 785,538. PATENTED MAR. 21, 1905.
D. E. BARTON.
SNAP HOOK.
APPLICATION FILED OCT. 27, 1903.
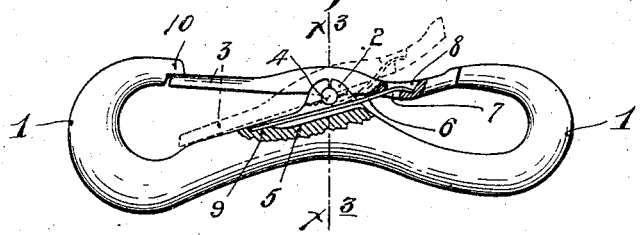
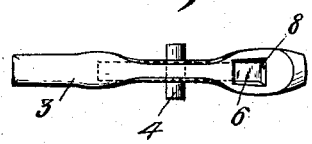
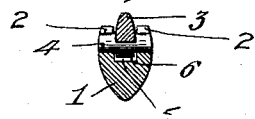
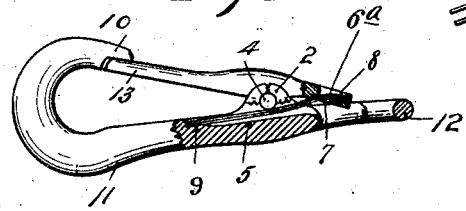
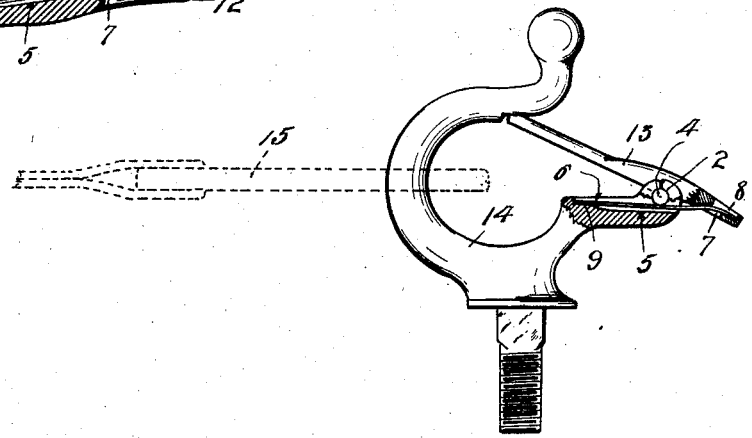
Witnesses.
A. S. Kilgord
A. H. Opsahl.
Inventor:
Delbert E. Barton
By his Attorneys,
Williamson Merchant No. 785,538.                                                                                    Patented March 21, 1905.

UNITED STATES PATENT OFFICE.

DELBERT E. BARTON, OF MINNEAPOLIS, MINNESOTA.

SNAP-HOOK.

SPECIFICATION forming part of Letters Patent No. 785,538, dated March 21, 1905.

Application filed October 27, 1903. Serial No. 178,688.

*To all whom it may concern:*

Be it known that I, DELBERT E. BARTON, a citizen of the United States, residing at Minneapolis, in the county of Hennepin and State of Minnesota, have invented certain new and useful Improvements in Snap-Hooks; and I do hereby declare the following to be a full, clear, and exact description of the invention, such as will enable others skilled in the art to which it appertains to make and use the same.

My present invention relates to snap-hooks and similar devices, and has for its object to improve the same in the several particulars hereinafter noted.

To such ends the invention consists of the novel devices and combinations of devices hereinafter described, and defined in the claims.

The invention is illustrated in the accompanying drawings, wherein like characters indicate like parts throughout the several views.

Figure 1 is a view in side elevation with some parts broken away, showing a double-ended snap-hook designed in accordance with my invention. Fig. 2 is a plan view of the tongue of the hook shown in Fig. 1 removed from working position. Fig. 3 is a section on the line $x^3$ $x^3$ of Fig. 1. Fig. 4 is a view in side elevation, showing a single hook designed in accordance with my invention, some parts thereof being sectioned. Fig. 5 shows a side elevation of a multifold spring, shown as used in connection with the hook illustrated in Fig. 4. Fig 6 is a side elevation of a check-hook designed in accordance with my invention.

One of the principal features of my invention is directed to an improved application of the spring to the tongue of the snap-hook or similar device, whereby an improved leverage action is obtained.

Another feature is directed to a novel arrangement of a single tongue, so that it simultaneously opens and simultaneously closes both hooks of a double-ended hook. This double-ended hook is illustrated in Fig. 1, wherein the numeral 1 indicates the body of the double-ended hook, the same having at its intermediate portion bearing-lugs 2, which lugs are preferably divided and adapted to be bent to shape after the tongue is applied in working position.

The numeral 3 indicates the double-ended tongue, which at its intermediate portion is formed with laterally-projecting trunnions 4, which when the tongue is in working position are journaled in the bearing-lugs 2. Below the trunnions 4 the intermediate portion of the hook-body 1 is cut away at 5 to afford clearance for a leaf-spring 6. The outer end of this leaf-spring is passed through a perforation 7 in that end of the tongue 3 which moves outward to open the hook, and the said outer end of the spring is slightly curved, so that it is sprung against or cramped between the shoulders formed by the perforation 7. Furthermore, the extreme outer end of said spring rests in a depression 8 of the tongue 3, which prevents the said spring from working outward. The inner end of the spring 6 presses against a bearing-surface 9 of the hook-body 1. The above-described construction permits the spring to be slipped endwise into working position and to be removed therefrom without disconnecting the tongue from the body of the hook. It will thus be seen that the leaf-spring 6 is anchored to the tongue 3 on one side of its pivot and reacts against the hook-body 1 on the other side of its pivot, so that it operates with a spring leverage action to hold the tongue in a closed position. Furthermore, it will be noted that when the tongue is forced into an open position, as indicated by dotted lines in Fig. 1, that end of the spring which is anchored to the tongue moves outward and throws the intermediate portion of the said spring against the hub or trunnion portion of the said tongue, thereby bending the spring at that point and increasing its tension. It will further be noted that the end of the tongue which moves inward to open the hook normally engages as a stop with the reduced or notched point 10 of the coöperating hook.

Referring to the construction illustrated in Figs. 4 and 5, the numeral 11 indicates the body of the single-ended hook, the same being provided with the bearing-lugs 2, the clearance-passage 5, the bearing-surface 9, and the reduced point 10, the same as the double-ended hook above described, but in this instance in lieu of the second hook is provided with a loop or eye 12, through which a strap or other connection may be passed to attach the hook thereto. Again, the tongue 13 has the trunnions 4, perforation 7, and recess 8 for co-operation with the leaf-spring, the same as in the above-described construction, but has not, of course, the additional or second tongue extension.

Another feature of my present invention consists in the employment of the manifold leaf-spring made up of duplicate sections $6^a$, which spring is applied in the same manner as the spring 6 above described, the several layers of the spring being placed tightly together and utilized as a single spring. This spring is illustrated as applied only to the hook shown in Fig. 4; but it might be applied to any of the hooks illustrated. By increasing or decreasing the number of the duplicate sections of the spring its strength may be increased or decreased at will, and at the same time should one of the sections become broken the spring would still be operative.

In Fig. 6, which illustrates the snap-hook in the form of a check-hook, the numeral 14 indicates the body of the check-hook, the same being provided with the bearing-lugs 2, clearance-passage 5 and spring bearing-surface 9, the same as in the two constructions already described. In this check-hook the tongue 13 is almost identically like that employed in the snap-hook illustrated in Fig. 4 and is provided with the same perforation or spring-passage 7 and depression or seat 8. The spring 6, which, as shown, is a single spring, is applied in the same manner and operates in the same way as that illustrated in Fig. 1. In connection with Fig. 6 the checkrein 15 is indicated by dotted lines.

From the foregoing description and statements made it must be evident that my invention above described is capable of considerable modification and that the same may be applied to snap-hooks and similar devices varying greatly in their general features of construction and in the purposes for which they are intended.

What I claim, and desire to secure by Letters Patent of the United States, is as follows:

1. The combination with a hook and a tongue pivoted thereto at its intermediate portion, said tongue having a perforation in that end thereof which moves outward when the body of the tongue is moved inward to open the hook, and a spring insertible into working position through said perforation and interlocking therewith, substantially as described.

2. The combination with a hook and a tongue pivoted thereto at its intermediate portion, said tongue having at that end which moves outward when the body of the tongue is moved inward to open the hook, a perforation 7 and countersunk seat 8, and a spring 6 insertible into working position through said perforation 7, the said spring when in working position pressing with one end against the body of said hook, with its other end resting in said seat 8 and interlocked therewith, substantially as described.

3. The combination with a double-ended hook, of a double-ended tongue pivoted at its intermediate portion to the intermediate portion of said hook, for coöperation with both hooks, one end of said tongue moving outward to open one of said hooks, and the other end moving inward to open the other of said hooks, and a spring anchored at one end to that end of said tongue which moves outward, to open the hook, and the other end of said spring pressing against said hook on the opposite side of the pivot of said tongue, substantially as described.

In testimony whereof I affix my signature in presence of two witnesses.

DELBERT E. BARTON.

Witnesses:
H. D. KILGORE,
F. D. MERCHANT.